United States Patent Office
2,822,251
Patented Feb. 4, 1958

2,822,251

CHARCOAL BRIQUETTES AND METHOD FOR THEIR MANUFACTURE

Richard W. Swinehart and Harry W. Bull, Midland, Mich., assignors to The Dow Chemical Company, Midland, Mich., a corporation of Delaware No Drawing. Application September 22, 1955
Serial No. 536,015

14 Claims. (Cl. 44—41)

This invention relates to improved, dustless charcoal briquettes and the like and to a method for their manufacture.

Traditionally, charcoal has found wide utilization as a fuel for various purposes. At the present time it is an especially popular cooking fuel for broiling and similar cooking techniques which are practiced over open grilles and the like. Of course, there still remain other uses for charcoal as a fuel. In its usual form, charcoal is a relatively dirty product. As a consequence, it is somewhat difficult to handle without experiencing considerable smudging and soiling. Even when it has been prepared in a compressed form, as in the shape of briquettes and the like, the usual charcoal product is dusty, dirty to handle and has a pronounced tendency to smudge upon contact. It is also difficult to make clean, dustless, non-soiling packages of ordinary charcoal.

It would be advantageous for charcoal to be in a dustless, non-smudging and non-soiling form having a clean and attractive appearance. This would obviate many of the objections to its use based on its dirtiness. It would also permit it to be packaged in a clean and convenient manner. Charcoal having such desirable characteristics would enjoy greater popular acceptance and might receive wider distribution to consumers. Many retail sales agencies and other consumer goods outlets are required to maintain such high standards of cleanliness and sanitation that they may be somewhat reluctant to handle charcoal in its conventionally available forms.

It is, therefore, among the purposes of the present invention to prepare a clean, dustless, non-smudging and more readily ignitible charcoal briquette or other shape which has minimized friability, good burning characteristics and an attractive appearance not germane to charcoal as it is usually available.

An improved charcoal briquette according to the present invention is comprised of charcoal mixed with a suitable binding material and compressed into a formed mass which is coated with a pigmented and plasticized water soluble cellulose ether composition. Charcoal briquettes may be prepared according to the present invention by mixing powdered charcoal and a suitable binding material; compressing the charcoal and binding material mixture into a formed mass, which advantageously is in the shape of a briquette, coating the formed mass with a composition containing a water soluble cellulose ether which may also advantageously contain a plasticizer for the cellulose ether and a pigment; and drying the applied coating composition to a film about the formed charcoal mass.

Finely divided charcoal is best employed for briquettes according to the present invention. Advantageously, charcoal having a maximum particle size not in excess of about that which can be passed through a No. 8 mesh screen is utilized.

While a variety of materials can be used to bind the charcoal in the formed mass, it is advantageous to use water soluble cellulose ethers for this purpose. Methyl esters of cellulose having between 1.5 and 2.0 methoxy groups per each recurring $C_6$ unit in the cellulose molecule may thus be employed. Preferably, however, water soluble cellulose ethers having both hydroxypropyl groups and methoxy groups as etherifying substituents are used for binding the charcoal. An aqueous solution of the binding material may be conveniently mixed with the charcoal to produce the charcoal and binding material blend which is compressed into a formed mass having any particular desired shape. The blend may contain moisture in an amount, for example, of about 30 percent by weight and, when cellulose ether binding materials are employed, it is usually sufficient to incorporate less than about 2 percent and advantageously about 1 percent by weight of the cellulose ether to satisfactorily bind the charcoal.

Other binding materials may also be employed for binding the charcoal if they are desired in place of a cellulose ether. For example, starch or glue may be used for this purpose. However, when such binding materials are utilized it may frequently be necessary to employ greater quantities of the binding material and the formed charcoal mass may have a greater propensity to form cracks and fissures than when cellulose ethers are utilized. Furthermore, when starches and glues are used to bind the charcoal, the resultant briquette may not burn as cleanly or may generate more offensive fumes. In addition, briquettes prepared with cellulose ether binders are usually less susceptible to attack from microorganisms on the binder which may cause mildew and other deterioration of the briquette to occur than when starch or glue binders are employed.

The wet blend of charcoal and the binding material is made into a formed mass of any desired size and shape before being dried and subsequently coated. Commonly employed techniques, such as compression molding and the like, may be utilized for this purpose. It is usually preferred for the formed charcoal mass to be in the shape of conventional briquettes although as mentioned, any desired shape may be made. Drying temperatures of about 150° C. for periods of time of about 4 hours are usually suitable for drying the charcoal masses from the wet condition in which they are formed.

The coating solution of the present invention is applied to the surface of the dried charcoal briquette or other formed mass in any desired manner. Dip techniques followed by drainage of excess solution from the briquette may advantageously be employed, although other methods of coating including brushing and spraying may also be utilized if desired. After being applied, the coating solution is dried on the briquette at any suitable dehydration temperature. Drying in convection currents or forced drafts of air at 60° to 150° C. is both convenient and satisfactory. An improved, dustless charcoal briquette or the like is thus provided.

Advantageously an aqueous coating solution of the cellulose ether is employed. The particular type of cellulose ether selected should have good film forming properties at the concentrations employed in the coating solution. The most suitable concentration of the ether in the solution depends on the method of application of the coating and on the characteristics of the briquette being coated. Too viscous a solution is difficult to handle during application and may require an impractically long time to permit proper drainage or removal of the excess applied solution before drying. Too thin a solution may not properly coat the briquette, especially if it is of low relative hardness and high absorptiveness. A cellulose ether with an average molecular chain length having such an order of magnitude that the absolute viscosity of a 2 percent by weight aqueous solution of the ether at 20° C. is not in excess of about 15 centipoises (cps.) is preferably employed. Concentrations of a 15 cps. cellulose ether in water of not greater than about 7 percent by weight are useful in the practice of the present invention. Advantageously and with greater economy, coating solutions containing between about 2 and about 5 percent by weight of the cellulose ether are especially desirable. While the coating solutions are advantageously prepared with methyl ethers of cellulose having between 1.5 and 2.0 methoxy groups per each recurring $C_6$ unit in the cellulose molecule, other water soluble cellulose ethers having about equivalent coating characteristics may also be suitably employed. These include the sodium salt of carboxymethyl cellulose, mixed methyl and hydroxypropyl cellulose ethers, hydroxyethyl cellulose, hydroxyethyl carboxymethyl cellulose and the like.

The pigments which advantageously may be incorporated in the coating solution are water dispersible types which impart any desired coloration to the coating. Calcium carbonate is preferably employed for this purpose since it produces an attractive, clean looking white coating and improves the igniting and burning properties of the briquette. The quantity of pigment incorporated in the coating solution depends to a great extent on the final color or shade of some particular color desired as well as on the particular pigment employed and on the properties of the charcoal briquette. An amount of calcium carbonate, for example, about equal in weight to the weight of the cellulose ether is advantageously employed in a coating solution, although as much as 6 parts and more by weight of pigment may, if desired, be used for each part by weight of the cellulose ether. In addition, dyes and other coloring materials may often be incorporated in the coating solution with the pigment in order to impart particular color effects to the coated briquette.

Other water dispersible pigments such as titanium dioxide, calcium sulfate, clay, talc and the like may also be employed in the coating solution to produce useful, better burning and attractive coated charcoal briquettes.

An amount of plasticizer between about 5 and about 230 percent by weight of the weight of the cellulose ether, depending on the particular plasticizer being employed, may be used in the coating solution. Frequently between about 1 and 2 parts by weight of plasticizer for each part by weight of cellulose ether is advantageously used. Any conventional plasticizing material for cellulose ethers may be employed. The presence of a plasticizer in the coating solution produces a film coating on the charcoal briquette which has less tendency to develop cracks and other surface blemishes. Propylene glycol is a highly desirable plasticizer for the coating solutions of the present invention although such other materials as invert sugar, di-sorbitol, glycerin, triethylene glycol, tetraethylene glycol, triethyl phosphate, various polyglycols, triethanolamine, and N-acetylethanolamine and the like may also be employed.

The coating solutions of the present invention are readily prepared by dissolving the cellulose ether in water in a conventional manner and adding the desired amounts of pigment and plasticizer to the solution.

In order to further illustrate the invention but without being restricted thereto, the following examples are given:

*Example I*

A charcoal blend was prepared from about 35 parts by weight of charcoal and about 15 parts by weight of a solution containing about 1 percent by weight based on the weight of the charcoal, of a water soluble cellulose ether having both hydroxypropyl and methoxy groups attached to the cellulose molecule such as the material which is currently made available under the trade name of "Methocel HG-4000" by The Dow Chemical Company. Charcoal briquettes were made by compressing about 50 grams of this blend for each briquette in a 2¼ inch positive compression die on a hydraulic press at about 1300 p. s. i. The formed charcoal briquettes were dried for about 4 hours at about 150° C.

The dried briquettes were cold dip coated in an aqueous 5 percent solution of a methyl ether of cellulose which had an absolute viscosity of 15 cps. in a 2 percent aqueous solution at 20° C. This material is also available at present from The Dow Chemical Company under the trade name "Methocel 15." About 1 part by weight of calcium carbonate pigment and 1.33 parts by weight of propylene glycol plasticizer for each part by weight of the cellulose ether were incorporated in the coating solution. Excess coating solution was allowed to drain from the briquettes before they were dried at about 150° C. for about 15 minutes.

The coated briquettes had a pleasing white color, were dustless and could readily be handled without becoming dirty or smudged. They ignited readily and burned in a clean manner without producing obnoxious fumes. They could be packaged into neat, dustless cartons and did not become mildewed upon standing for prolonged periods under relatively humid conditions at room temperature.

*Example II*

Charcoal briquettes were prepared like those in the foregoing example. Separate samples of the prepared briquettes were coated with several various coating solutions similar to that employed in Example I excepting that the concentrations of the cellulose ether solutions was varied between about 2 and about 7 percent by weight. Likewise, the amounts of pigment employed in the various coating solutions were altered in ratios which varied from about 1 to about 6 parts by weight of pigment to each part by weight of the cellulose ether. In all cases the coated briquettes were dustless and had other desirable properties about equivalent to those in Example I.

Since certain changes and modifications in the practice of the present invention can be readily entered into without substantially departing from its spirit and scope, it is to be understood that all the foregoing be interpreted as being merely illustrative of certain embodiments of the invention.

What is claimed is:

1. A dustless and non-smudging charcoal briquette comprising charcoal mixed with a binding material for charcoal that is selected from the group consisting of water soluble cellulose ethers, starch and glue and compressed into a formed mass which is coated with a film-forming composition of a water soluble cellulose ether.

2. A dustless and non-smudging charcoal briquette comprising charcoal mixed with a binding material for charcoal that is selected from the group consisting of water soluble cellulose ethers, starch and glue and compressed into a formed mass which is coated with a pigmented and plasticized film-forming composition of a water soluble cellulose ether.

3. A charcoal briquette according to claim 2 wherein the film-forming composition of the water soluble cellulose ether contains a methyl ether of cellulose having an average of between about 1.5 and 2.0 methoxy groups attached to each $C_6$ unit in the cellulose molecule.

4. A charcoal briquette according to claim 2 wherein the film-forming composition of the water soluble cellulose ether is pigmented with calcium carbonate.

5. A charcoal briquette according to claim 2 wherein the film-forming composition of the water soluble cellulose ether contains about 1 part by weight of calcium carbonate as a pigment for each part by weight of the cellulose ether.

6. A method for preparing dustless and non-smudging charcoal briquettes which comprises mixing charcoal with a binding material; compressing the charcoal and binding material for charcoal that is selected from the group consisting of water soluble cellulose ethers, starch and glue mixture into a formed mass; coating the formed mass with a film-forming composition of a water soluble cellulose ether; and drying the applied coating composition to a film about the formed charcoal mass.

7. A method for preparing dustless and non-smudging charcoal briquettes which comprises mixing charcoal with a binding material for charcoal that is selected from the group consisting of water soluble cellulose ethers, starch and glue, said binding material being in aqueous dispersion; compressing the wet mixture of charcoal and binding material into a formed mass; drying the formed charcoal mass; coating the dried formed mass with an aqueous film-forming composition of a water soluble cellulose ether, a plasticizer for the ether and a water-dispersible pigment; and drying the applied coating composition to a film about the formed charcoal mass.

8. A method for preparing dustless and non-smudging charcoal briquettes which comprises mixing charcoal with a binding material for charcoal that is selected from the group consisting of water soluble cellulose ethers, starch and glue, said binding material being in aqueous dispersion; compressing the wet mixture of charcoal and binding material into a formed mass; drying the formed charcoal mass; coating the dried formed mass with an aqueous film-forming composition of a water soluble cellulose ether, said composition containing less than about 7 percent by weight of said water soluble cellulose ethers, a plasticizer for the ether and a water-dispersible pigment; and drying the applied coating composition to a film about the formed charcoal mass.

9. The method of claim 8 wherein the charcoal has a maximum particle size not in excess of about that which can be passed through a No. 8 mesh screen.

10. The method of claim 8 wherein the binding material mixed with the charcoal is a hydroxypropyl methyl cellulose having between 1.5 and 2.0 methoxy groups per each recurring $C_6$ unit is the cellulose molecule.

11. The method of claim 8 wherein the aqueous film-forming coating composition contains between about 2 and about 5 percent by weight of the water soluble cellulose ether.

12. The method of claim 8 wherein the water soluble cellulose ether in the aqueous film-forming coating composition is a methyl ether of cellulose having between 1.5 and 2.0 methoxy groups per each recurring $C_6$ unit in the cellulose molecule and which has an average molecular chain length having such an order of magnitude that the absolute viscosity of a 2 percent by weight aqueous solution of the ether at 20° C. is not in excess of about 15 centipoises.

13. The method of claim 8 wherein the pigment in the aqueous film-forming coating composition is calcium carbonate.

14. The method of claim 8 wherein the aqueous film-forming coating composition contains between about one and six parts by weight of calcium carbonate pigment for each part by weight of cellulose ether.

References Cited in the file of this patent
UNITED STATES PATENTS

| | | |
|---|---|---|
| 2,673,812 | Greaves et al. | Mar. 30, 1954 |
| 2,693,437 | Spradling | Nov. 2, 1954 |
| 2,725,301 | Mayer et al. | Nov. 29, 1955 |

UNITED STATES PATENT OFFICE
CERTIFICATE OF CORRECTION

Patent No. 2,822,251                          February 4, 1958

Richard W. Swinehart et al.

It is hereby certified that error appears in the printed specification of the above numbered patent requiring correction and that the said Letters Patent should read as corrected below.

Column 4, lines 74 and 75, strike out "for charcoal that is selected from the group consisting of water soluble cellulose ethers, starch and glue" and insert the same after "material" and before the semi-colon in line 73, same column; column 6, line 4, for "unit is" read -- unit in --.

Signed and sealed this 29th day of July 1958.

(SEAL)
Attest:

KARL H. AXLINE                                    ROBERT C. WATSON
Attesting Officer                                 Commissioner of Patents